UNITED STATES PATENT OFFICE.

FRANZ GATZSCHE, OF FREIBERG, GERMANY, ASSIGNOR TO THE "N. L." SYNDICATE, LIMITED, OF LONDON, ENGLAND.

COMPOSITION FOR MAKING FLOOR-CLOTH.

SPECIFICATION forming part of Letters Patent No. 637,106, dated November 14, 1899.

Application filed August 31, 1899. Serial No. 729,109. (No specimens.)

*To all whom it may concern:*

Be it known that I, FRANZ GATZSCHE, manager, a subject of the German Emperor, residing at Freiberg, Saxony, in the Empire of Germany, have invented a certain new and useful Composition of Matter to be Used for Making Floor-Cloth; and I do hereby declare the following to be a full, clear, and exact description of the invention, such as will enable others skilled in the art to which it appertains to make and use the same.

My composition consists of the following ingredients, combined in the proportions stated, viz: water, seven gallons; glue, one pound; wax, one-fourth pound; plumbic ocher, one-fourth pound; linseed-oil, one-half pound; tungstic acid, one ounce. These ingredients are to be thoroughly mixed at a temperature of 80° centigrade. A felted webbing or fabric is immersed in the composition and is left therein until it is entirely impregnated with the mixture. It is then taken out and pressed by passing it through rollers and when cold is printed with any desired design in printing-machines.

By the use of the above-named composition a fabric is obtained offering an excellent substitute for linoleum for floor-cloth and cheap, easily manufactured, durable, and of good appearance.

I am aware that some of the ingredients named have been used for a similar purpose; but I am not aware that all the ingredients of my composition in the proportions stated have been used together.

What I claim, and desire to secure by Letters Patent of the United States, is—

The herein-described composition of matter to be used for making floor-cloth, consisting of water, glue, wax, plumbic ocher, linseed-oil, and tungstic acid, in the proportions specified.

In testimony whereof I have hereunto affixed my signature in presence of two witnesses.

FRANZ GATZSCHE.

Witnesses:
   WM. O. BROWN,
   ARTHUR E. EDWARDS.